US012730007B2

(12) United States Patent
Wu et al.

(10) Patent No.: US 12,730,007 B2
(45) Date of Patent: Sep. 8, 2026

(54) PEAK POSITION MEASUREMENT OFFSET IN A TWO-DIMENSIONAL OPTICAL SPECTRUM

(71) Applicants: Thermo Fisher Scientific (Bremen) GmbH, Bremen (DE); Thermo Fisher Scientific (Shanghai) Instruments Co., Ltd., Shanghai (CN)

(72) Inventors: Shenghai Wu, Shanghai (CN); Antonella Guzzonato, Bremen (DE); Cheng Wang, Shanghai (CN)

(73) Assignees: Thermo Fisher Scientific (Shanghai) Instruments Co., Ltd., Shanghai (CN); Thermo Fisher Scientific (Bremen) GmbH, Bremen (DE)

( * ) Notice: Subject to any disclaimer, the term of this patent is extended or adjusted under 35 U.S.C. 154(b) by 144 days.

(21) Appl. No.: 18/721,612

(22) PCT Filed: Dec. 12, 2022

(86) PCT No.: PCT/CN2022/138299
§ 371 (c)(1),
(2) Date: Jun. 18, 2024

(87) PCT Pub. No.: WO2023/116481
PCT Pub. Date: Jun. 29, 2023

(65) Prior Publication Data

US 2025/0052615 A1 Feb. 13, 2025

(30) Foreign Application Priority Data

Dec. 21, 2021 (WO) ................ PCT/CN2021/139952

(51) Int. Cl.
*G01J 3/443* (2006.01)
*G01J 3/28* (2006.01)

(52) U.S. Cl.
CPC ....... *G01J 3/443* (2013.01); *G01J 2003/2866* (2013.01)

(58) Field of Classification Search
CPC .......................... G01J 3/443; G01J 2003/2866
See application file for complete search history.

(56) References Cited

U.S. PATENT DOCUMENTS 5,175,775 A * 12/1992 Iwaki .................... G06V 10/92
382/280
5,596,407 A 1/1997 Zander et al.
2007/0145258 A1 6/2007 Nelson et al.

FOREIGN PATENT DOCUMENTS

EP 0692703 A1 1/1996
EP 1004005 B1 * 10/2003 ................ G01J 3/28
(Continued)

OTHER PUBLICATIONS

Brandt, G. M. et al., Automatic Échelle Spectrograph Wavelength Calibration, Arxiv.org, Cornell University Library, 13 pages (Oct. 2019).

(Continued)

*Primary Examiner* — Jamil Ahmed
(74) *Attorney, Agent, or Firm* — Klarquist Sparkman, LLP

(57) ABSTRACT

A peak position measurement offset is determined in a two-dimensional optical spectrum. A plurality of peaks are identified that appear in both a spectrum obtained from a reference material at known conditions and a spectrum obtained from a sample of interest. The peak position measurement offset is determined by a comparison of a pattern formed by peak positions of the plurality of identified peaks in the spectrum obtained from the sample of interest against the plurality of identified peaks in the spectrum obtained from the reference material.

18 Claims, 13 Drawing Sheets

(56) References Cited

FOREIGN PATENT DOCUMENTS

| | | | |
|---|---|---|---|
| GB | 2586046 | A | 2/2021 |
| JP | H10-142054 | | 5/1998 |
| JP | 4372352 | | 11/2009 |
| WO | WO2021/018992 | | 2/2021 |

OTHER PUBLICATIONS

International Search Report and Written Opinion for PCT/CN2022/138299, mailed Mar. 14, 2023.
Office Action for Japanese Application No. 2024-537956, mailed Aug. 14, 2025.
Examination Report for Australian Application No. 2022423102, mailed Apr. 14, 2025.

* cited by examiner b)

a)

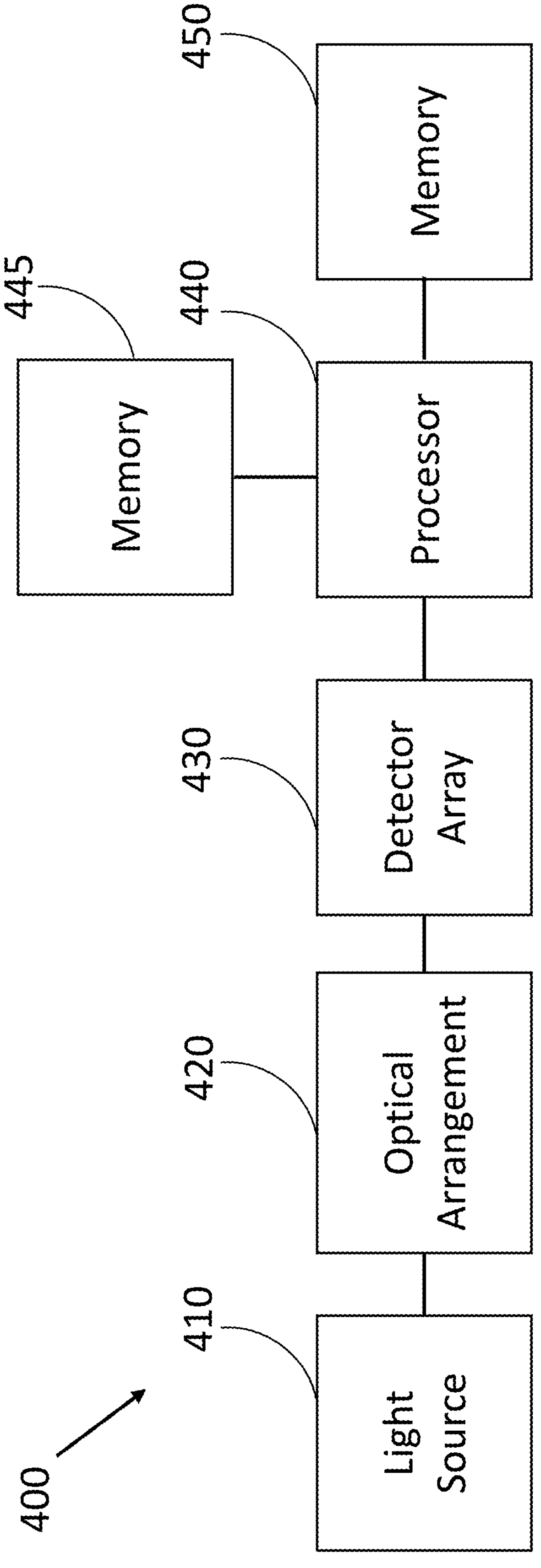
Fig. 13 – PRIOR ART

PEAK POSITION MEASUREMENT OFFSET IN A TWO-DIMENSIONAL OPTICAL SPECTRUM

CROSS REFERENCE TO RELATED APPLICATIONS

This is the U.S. National Stage of International Application No. PCT/CN2022/138299, filed Dec. 12, 2022, which was published in English under PCT Article 21(2), which in turn claims the benefit of Chinese Patent Application No. PCT/CN2021/139952, filed Dec. 21, 2021, which applications are incorporated herein in their entirety.

TECHNICAL FIELD OF THE DISCLOSURE

The disclosure concerns determining a peak position measurement offset in a two-dimensional optical spectrum.

Background to the Disclosure

In Inductively Coupled Plasma Optical Emission Spectroscopy (ICP-OES), a plasma source ionizes and excites atoms that are in the gases that make up the plasma and/or in the sample. The light emitted by the excited atoms is collected, scattered, and guided through a series of mirrors towards a detector. Each ionized element emits a characteristic wavelength, which after scattering, will occupy a characteristic position at the two-dimensional detector array.

The ensemble of all emitted wavelengths (from sample and plasma) at any one point, scattered and projected onto the detector, is called an "echellogram" or "fullframe". During production and testing of an ICP-OES instrument, a mapping between position (expressed as x, y coordinates on the physical surface of the detector, for example, a CCD chip) and wavelength, diffraction order is performed via a procedure called wavelength calibration. This procedure is performed while taking special care that the optical system is thermally stabilized and that the temperature is held constant throughout the measurements required for the procedure. Intensity peaks can be identified in the spectrum, each peak representing a signal coming from a respective characteristic wavelength.

The model mapping position to wavelength and/or order refers to these stable conditions. These stable conditions are not always met during routine measurements (of a sample of interest), in view of the environment (for example, temperature, airflow, etc.). For instance, temporary temperature fluctuations in the optics may cause the mirrors to rotate and thereby introduce a positional shift onto the detector array. The model is thus sensitive to environmental conditions, so the mapping from position to wavelength and/or order is typically incorrect for routine measurements. In practice, a drift or offset is introduced to the position compared with the model.

Existing approaches try to reduce the drift, in particular by thermally decoupling the plasma, which is at a temperature between 5000 K and 10000 K, from the optical tank. Some ways to achieve this include: physically detaching heatsinks; using different materials at the interface between torch box and optical tank; and active heating and/or cooling devices at the interface between torch box and optical tank. All of these entail tighter tolerances, higher material costs and/or increased complexity.

For this reason, a drift correction has been considered, in order to reposition each peak so that it can be correctly identified via its characteristic position onto the detector. An existing technique for drift correction is described in GB2586046. This uses a peak that appears in both a reference spectrum and a sample spectrum, such as from $CO_2$. A subarray can be defined around the expected peak and the analysis can be limited to the subarray region. By careful definition of the subarray, interference from adjacent peaks can be mitigated. This allows the drift from the expected position of the peak to be calculated. The identified location of an unknown peak in the same sample spectrum can then be shifted using the determined drift. Also, the spectrum values can be interpolated within the subarray, to determine the peak intensity value more precisely.

In practice, this approach can be implemented by selecting one peak from multiple options that are always present in the fullframe. The offset is then linearly applied to the entirety of the fullframe, effectively cancelling out the drift.

This approach becomes more difficult to implement when none of the peaks that always appear in the fullframe have a clearly identifiable position in the spectra. For example, this can happen due to saturation of the recorded intensity, interference by another peak or excessive displacement of the fullframe. In such cases, the drift correction may fail. In some implementations, the measured drift may differ depending on the selected peak. A more robust and accurate approach for drift or offset measurement is therefore desirable.

SUMMARY OF THE DISCLOSURE

Against this background, there is provided a method of determining a peak position measurement offset in a two-dimensional optical spectrum according to claim 1. A computer program for performing any method herein disclosed is also provided. Further optional and/or advantageous features are defined in the dependent claims.

The approach of this disclosure uses significantly more information to estimate the offset or drift of the fullframe. In existing approaches, a linear offset is estimated based on the position of a single reference peak (which is a peak in both of the two dimensions). In contrast, the approach of the present disclosure uses the pattern formed by multiple peaks (an ensemble of two-dimensional peaks) to estimate the drift. This may allow linear and/or non-linear offsets to be measured. Use of the pattern may also allow the effect of distortions and/or interferences on the peaks to be mitigated or discounted. The pattern is defined by the peak positions, although such positions need not be precise and the combination of approximate peak positions, and optionally together with and/or taking account of other information about the peaks, for example one or more of: geometrical structures (for example, shapes) formed by the peak positions; intensities (which may include relative intensities, for instance simply ordering the peaks by intensity); and peak shapes (for instance, a three dimensional peak intensity across the two-dimensional spectrum). The additional information (other than peak positions) may form part of the pattern and/or may be used to refine a pattern of peak intensities. The peaks advantageously appear in both a spectrum obtained from a reference material at known conditions and a spectrum obtained from a sample of interest. A transformation or movement of the pattern (for example, a translation, rotation, change in size, warp or deformation) can be identified and an estimate of measurement of drift made on this basis.

Approaches according to the disclosure can be used in a much wider span of environmental conditions (for example, temperature) and a wider choice of sample matrices (for instance, high carbon). Additionally or alternatively, the approach may be more robust for two-dimensional image spectra, especially when reference peaks may be surrounded by different sample peaks. The two-dimensional optical spectrum may be obtained from an Inductively Coupled Plasma Optical Emission Spectroscopy (ICP-OES) instrument, although other forms of optical spectroscopy may be used instead.

The peaks are beneficially selected to make a change in the pattern formed by the peaks provide a measure of the drift that is accurate and robust. In particular, at least three peaks or at least four peaks are preferably used (although more can be used, for instance, at least or exactly 5, 6, 7 or higher). In this way, the positions of the peaks in the two-dimensional optical spectrum define a polygon, for instance by connecting each peak to the two most proximal adjacent peaks. More preferably, the polygon is asymmetric (so that rotation of the polygon can be recognised). It is also advantageous that the peaks are characteristic of a plasma chemistry of the reference and sample materials. The area surrounded by the peaks is preferably at least (or greater than) 10% of the spectrum.

An algorithm may be used to estimate the drift, for instance an image registration algorithm (for instance, a phase correlation algorithm) and/or a machine learning algorithm (for instance using an artificial neural network). The (solid) polygon shape can be used as a characteristic shape for image registration. In some implementations, the offset may be determined by first estimating or measuring a peak-specific offset for each peak. Then, an overall peak position measurement offset can be established from the peak-specific offsets, for example by a combination of the peak-specific offsets (for instance, a weighted average) or by a further machine learning algorithm taking the peak-specific offsets as inputs, for example a line regression algorithm.

Pre-processing of the two-dimensional optical spectrum data is preferably performed before providing the data to an image registration and/or machine learning algorithm. A variety of pre-processing steps may be considered and any combination of these may be implemented, although preferred combinations are discussed here.

For instance, a subarray may be established around peak. Each subarray (for both the reference image and the sample image) may be based on the respective position of the peak in the reference spectrum. Only data within the subarrays may be provided to and/or used in the algorithm used to estimate the drift. For instance, pixels outside the subarrays may be removed from both sample and reference spectra. The use of subarrays may help to mitigate interference from adjacent peaks and/or reduce calibration cost. Removing pixels the subarrays may increase the proportion of Regions Of Interest (ROI) for better accuracy of image registration.

One or more may be used of: a baseline level removal; a logarithmic transformation; and an intensity normalization. In some implementations, each peak may be normalized with a number according to a number indicative of the relative maximum (magnitude) of the peak compared with the other peaks. For example, the peaks may be normalized such that the highest peak has a lowest number, the second highest peak has a second lowest number and continuing in this way until the smallest peak has the highest number. The numbers used may be prime numbers (in particular, contiguous prime numbers).

Peak-specific offsets may be obtained in some approaches. Then, a weighted average of these may be taken to determine an overall offset. In particular, weights for the averaging may be based on relative image correlations between the subarray in the reference spectrum for the peak and the corresponding the subarray in the sample spectrum.

The determined offset can be validated. For example, image correlations can be determined between the reference spectrum and the sample spectrum before and after correction (according to the determined offset). If the correlation increases, the determined offset may be deemed valid.

In some approaches, a precise peak position is established for each peak. This may be achieved by analysis of the spectral intensities around each peaks. For example, a K-means clustering algorithm on portions of spectrum (each portion comprising a single peak) can be used. The pattern may then be based on the precise peak positions.

A machine learning image registration algorithm (which is preferably semi-supervised) may first be trained. In one implementation, the algorithm may be trained, for each peak, using a portion of the spectrum centred on the respective peak. The trained algorithm can then be queried to determine a peak-specific offset. For example, a polygon may be defined by connecting adjacent peaks for all of the identified peaks. Then, the portion of the spectrum centred on each peak together with a corresponding portion of the defined polygon may be used to train the algorithm.

BRIEF DESCRIPTION OF THE DRAWINGS

The disclosure may be put into practice in a number of ways, and preferred embodiments will now be described by way of example only and with reference to the accompanying drawings, in which:

FIG. 13 schematically depicts an existing system for optical spectrometry.

DETAILED DESCRIPTION OF PREFERRED EMBODIMENTS

The approach of the present disclosure uses the pattern formed by multiple peaks (typically, three, four or more peaks). The peaks are present in both a reference spectrum or image (emission spectrum recorded while a reference material, which may be no sample or only de-ionized water, is fed through the sample introduction system) and a sample spectrum or image (emission spectrum recorded while a sample material, comprising the sample of interest, is fed through the sample introduction system). Preferably, the peaks are characteristic of the plasma chemistry (that is, the mixture of elements that are ionized in the plasma) and hence are always present (as long as the plasma is ignited), regardless of the chemicals introduced as sample. The peaks may be identified from common elements (for instance Nitrogen, Hydrogen, Carbon) that likely exist in all test samples. Also, the peaks are desirably strong (intensity above a minimum threshold) and/or not easily interfered by other sample peaks. The rough positions for such peaks in the spectrum may be known.

Figure 1:
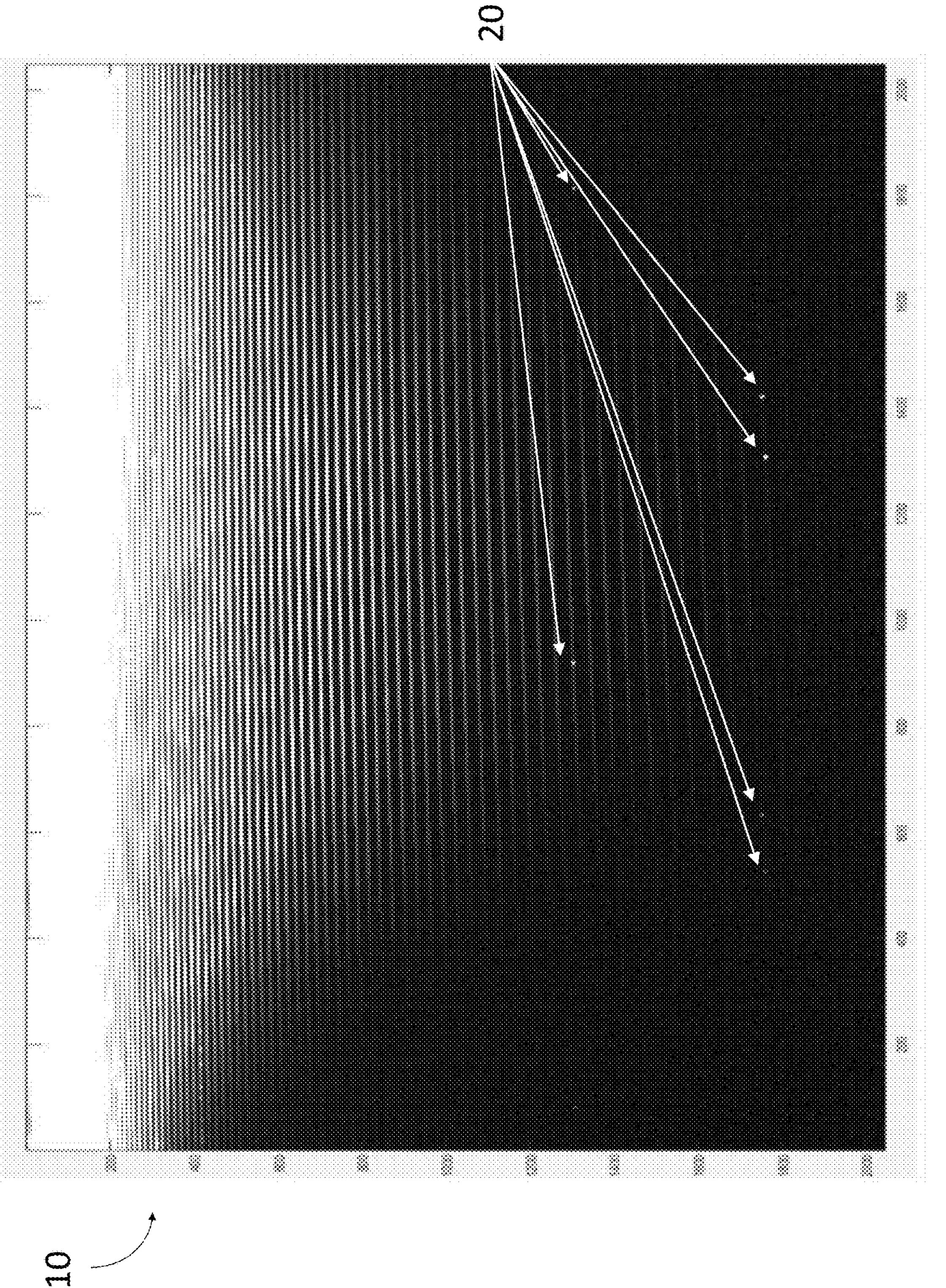
FIG. 1 shows an example two-dimensional optical spectrum for a reference material taken at known conditions.

Referring first to FIG. 1, there is shown an example two-dimensional optical spectrum 10 for a reference material taken at known conditions. This is a reference spectral image taken using ICP-OES in grayscale. Six peaks 20 are identified in the spectrum.

Figure 2:
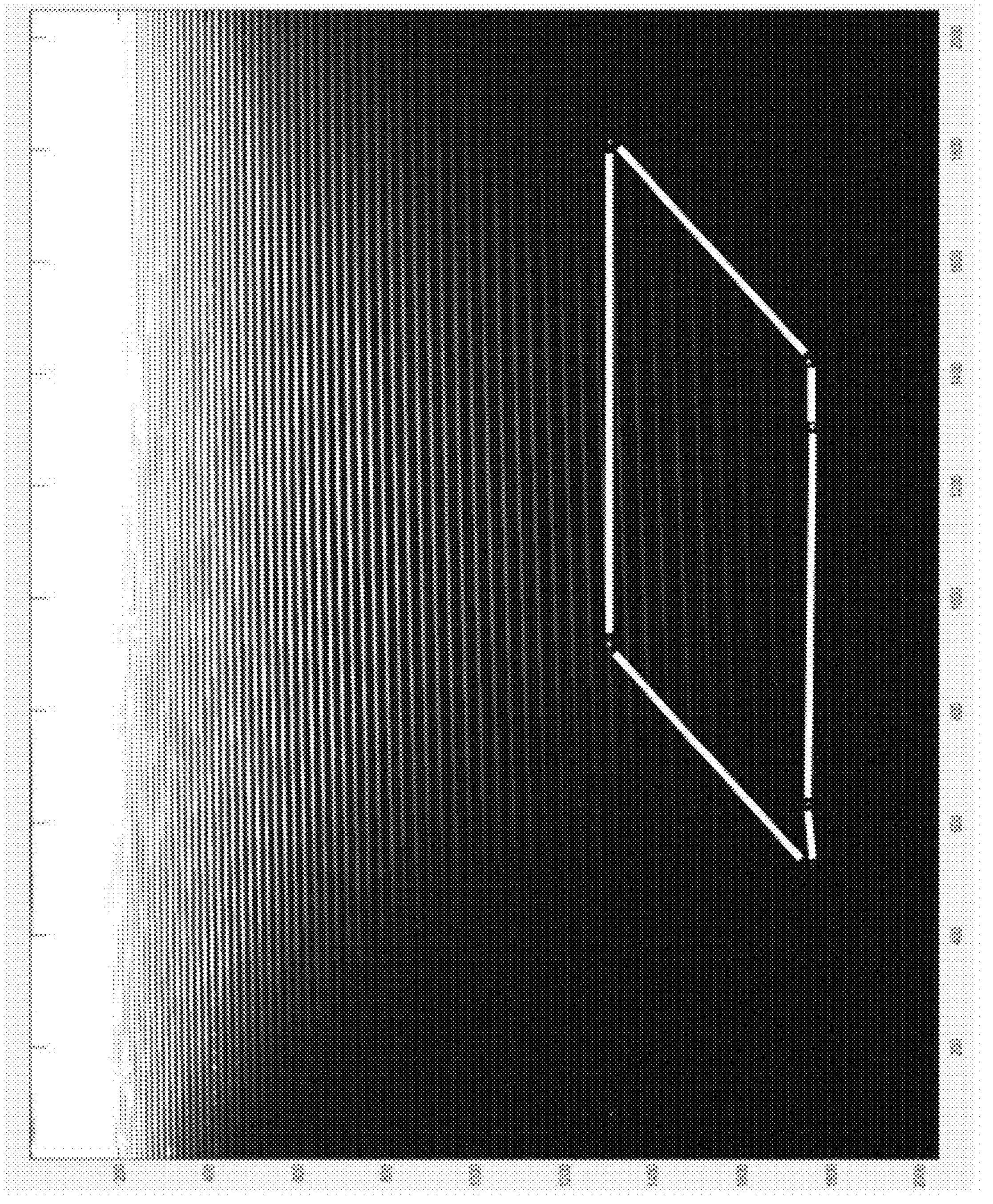
FIG. 2 shows the example two-dimensional optical spectrum of FIG. 1 with six identified peaks connected by lines.

Now with reference to FIG. 2, there is shown the example two-dimensional optical spectrum 10 of FIG. 1 with the six identified peaks 20 connected by lines (each line connecting two most proximal adjacent peaks). As can be seen, these six peaks form a polygon shape. It will be established that any three or more peaks can form the vertices of a polygon shape, but four or more peaks are preferred. It is preferable that the peaks are selected so that they form the vertices of a polygon shape and more preferably, an asymmetric polygon shape. If a symmetric polygon shape is used, it may be difficult to distinguish between peak rotation and translation. Also, it is desirable that the area surrounded by the selected reference peaks (area of polygon formed by peaks) is greater than 10% of the area of the whole spectral image ("full-frame").

The pattern formed by this polygon may change between the reference spectrum and the sample spectrum. By processing changes in the pattern, an estimate or measurement of drift may be made. Image registration is a beneficial tool for determining the drift from the pattern changes. The pattern uses the peak positions, but may also take account of (comprise and/or be refined by) one or more of: geometrical shapes formed by the peak positions (for instance, the polygon discussed above); intensities or relative intensities of the peaks; and peak shape. By considering the pattern more generally than just the peak positions alone, account can be made for distortions and/or interferences that affect determination of the peak position. For instance, an interference may cause a peak that partially or fully overlaps the reference peak. As a result, the peak position may be difficult to determine (for example, a double-peak or other more complex peak shape may appear). Additionally or alternatively, the peak position may seem to have shifted due to the interference rather than due to drift, as apparent from a change in (relative) intensity and/or a change in a shape of the peak. These effects can also be apparent due to non-drift related distortion. Determining drift based on changes in the pattern may therefore account for these effects, for example, by reducing the weight (or discounting) peaks where the change in the pattern is not only in the peak position.

Two different algorithms for processing the changes are considered, by way of example. In a first approach, a phase correlation image registration algorithm is used. This may determine the offset from a change in the pattern formed by the positions and the relative intensities of the reference peaks. In a second approach, a machine learning image registration implementation is applied. This may use a change in the polygon shape formed by precise locations of the reference peaks to determine the offset. These two approaches will be discussed in more detail below.

Each approach uses different pre-processing steps to take best advantage of the respective algorithm. It will be understood that different pre-processing steps are possible and indeed, different algorithms may also be applied. It will also be understood that, when looking at a change in a pattern of peaks, an overall offset may be determined from a combined analysis of multiple peaks together or by analysing a change in one or more individual peaks to provide peak-specific offsets and then using these to determine an overall offset.

In a general sense, there may be considered a method of determining a peak position measurement offset in a two-dimensional optical spectrum (specifically a two-dimensional optical spectrum obtained from a sample of interest). The method comprises: identifying a plurality of peaks that appear in both: a spectrum obtained from a reference material at known conditions; and the spectrum obtained from the sample of interest; and determining the peak position measurement offset by a comparison of a pattern formed by peak positions of the plurality of identified peaks in the spectrum obtained from the sample of interest against a pattern formed by peak positions of the plurality of identified peaks in the spectrum obtained from the reference material. This method may be implemented by a controller, which may for example form part of an optical spectrometer, or may be implemented in the form of a computer program, comprising instructions that are configured to perform the method when executed by a computer. The disclosure may also provide one or more of: an optical spectral analyser; a computer program; an optical spectrometer (for instance, a ICP-OES instrument), which may comprise such an optical spectral analyser and/or computer program or may be configured to operate according to the method.

Preferably, the plurality of identified peaks comprise at least three or four peaks. It is desirable that positions of the plurality of identified peaks in the two-dimensional optical spectrum define vertices of polygon (by connecting each peak to two most proximal adjacent peaks) and preferably an asymmetric polygon. Beneficially, the plurality of identified peaks are characteristic of the plasma chemistry of the reference and sample materials. In embodiments, an area of the two-dimensional spectrum surrounded by the plurality of identified peaks (and/or a polygon defined by the peaks, for example as discussed above) is at least (or greater than) 10% of the two-dimensional optical spectrum (and optionally, at least 20%, 25%, 30%, 40%, 50%, 60%, 70%, 80% or 90%).

In certain implementations, the pattern is formed by peak positions and (relative) intensities and/or shapes of the plurality of identified peaks.

The step of determining comprises establishing the comparison using an image registration algorithm (for instance, a phase correlation algorithm) and/or a machine learning algorithm.

The peak position measurement offset may be determined using a peak-specific offset for each of the plurality of peaks. For example, the peak-specific offsets may be combined, interpolated or otherwise analysed.

The two specific implementations are now described by way of example only. Further details according to the general senses discussed above will be again referenced below.

Implementation 1

The implementation will be discussed with reference to seven steps and uses a phase correlation image registration algorithm.

Figure 3:
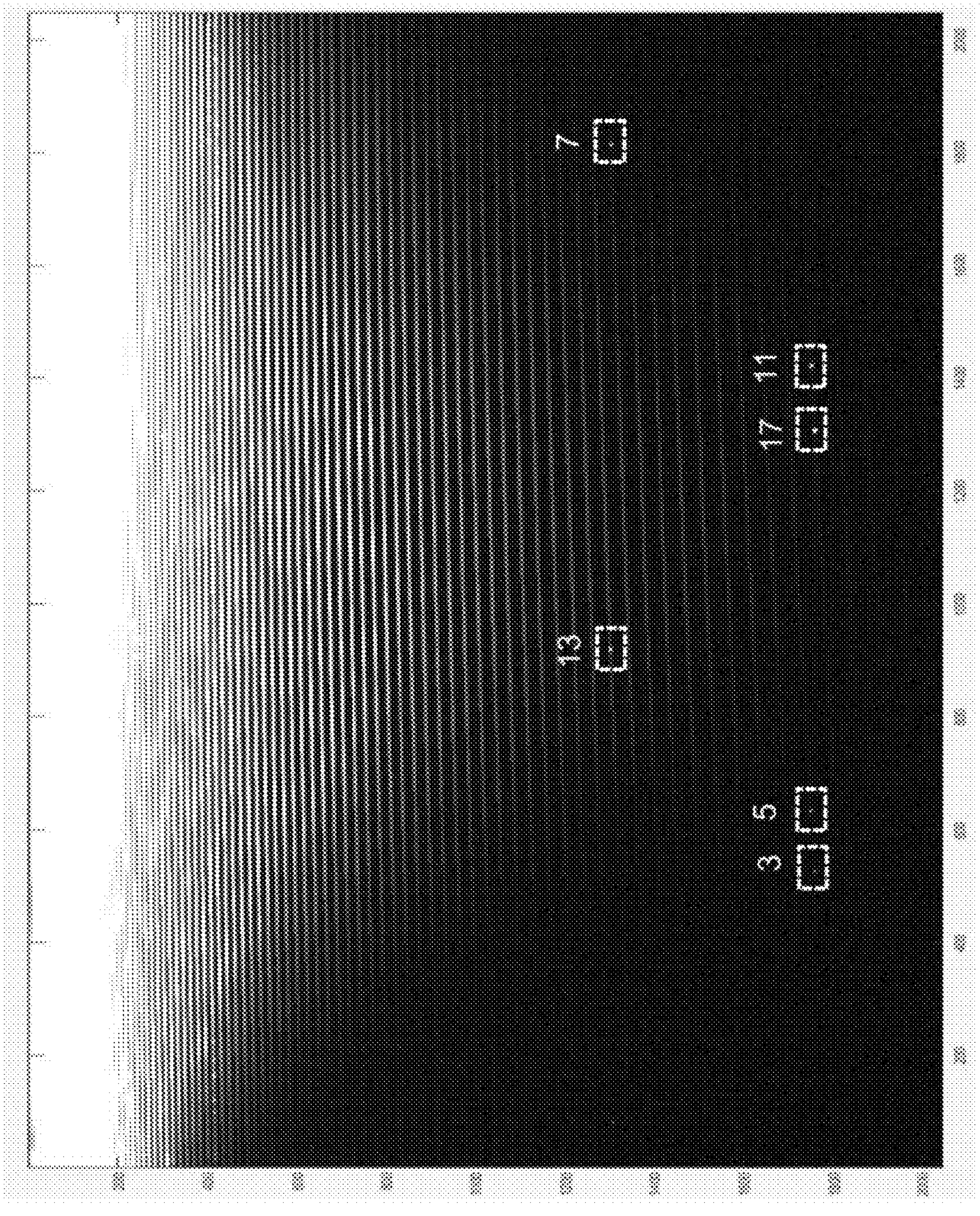
FIG. 3 depicts the example two-dimensional optical spectrum of FIG. 1 with six identified peaks surrounded by square frames (sub-arrays) in accordance with a first implementation.

1) In the reference image, four or more reference peaks are selected (as discussed below, fewer reference peaks may be used, but four are preferred). Referring to FIG. 3, there is depicted the example two-dimensional optical spectrum of FIG. 1 with six identified peaks surrounded by square frames (subarrays). The frame width or thickness, in every direction from the identified peak, is bigger than the maximum possible drift (a geometrical offset of the peak position with respect to a fixed coordinate system mapping of the complete fullframe). The minimum size of subarray is desirably larger than the maximum drift of image, which may ensure that the peaks of sample images are always in the subarray. The maximum size of subarray is typically small enough to include one peak (and only one, if possible) in the subarray.

Each peak is labelled with a different prime number, sorted by ascending relative signal intensity. These prime number labels begin at 3. The starting point is not important and the number 2 is avoided to avoid any even-numbered labels. The absolute position of the frames (pixel index of subarrays) is recorded and labelled with the assigned prime number-labels.

2) A newly acquired image is obtained by ICP-OES of a sample material of interest (from here on, this image is referred to as a sample image). The reference peaks in the sample image are shifted with respect to the peaks in the reference image by an unknown amount to be estimated. In the sample image, the peaks are again identified and subarray frames are determined according to absolute position (pixel index) in the reference image, regardless of the position of the reference peaks in the sample image.

Figure 4:
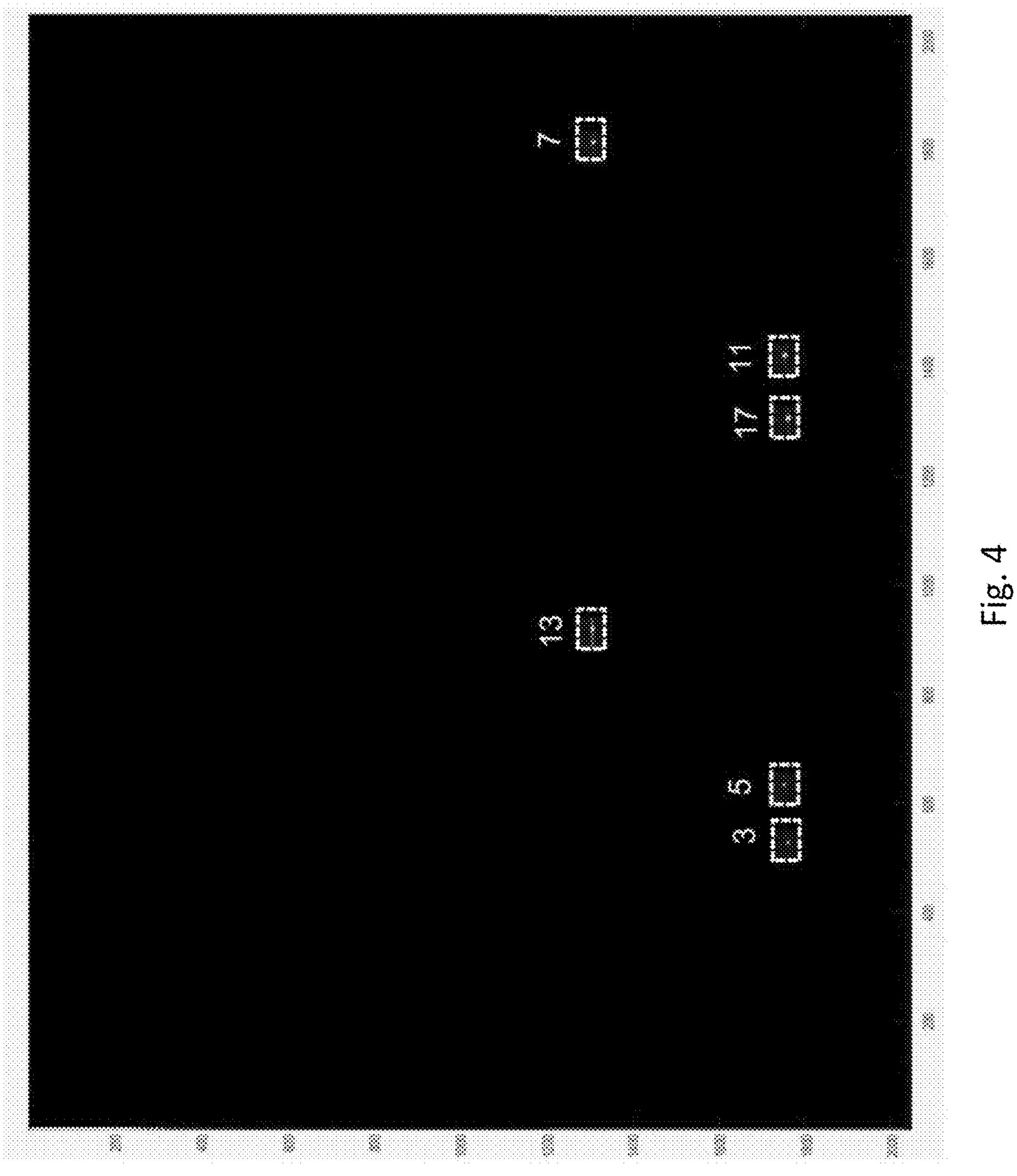
FIG. 4 shows the example two-dimensional optical spectrum of FIG. 3 with additional processing to remove data outside the sub-arrays.

3) Every pixel that is not within the chosen subarrays frame is set to zero for both reference image and sample image. This may help to avoid the computation algorithm or the machine learning algorithm being led astray by too many features (pixels) not carrying relevant information. Additionally or alternatively, it may make sure the computation algorithm or the training is computationally efficient. Referring to FIG. 4, there is shown the example two-dimensional optical spectrum of FIG. 3 with additional processing to remove data outside the sub-arrays (dot-square frames), in accordance with this step.

Figures 5A, 5B:
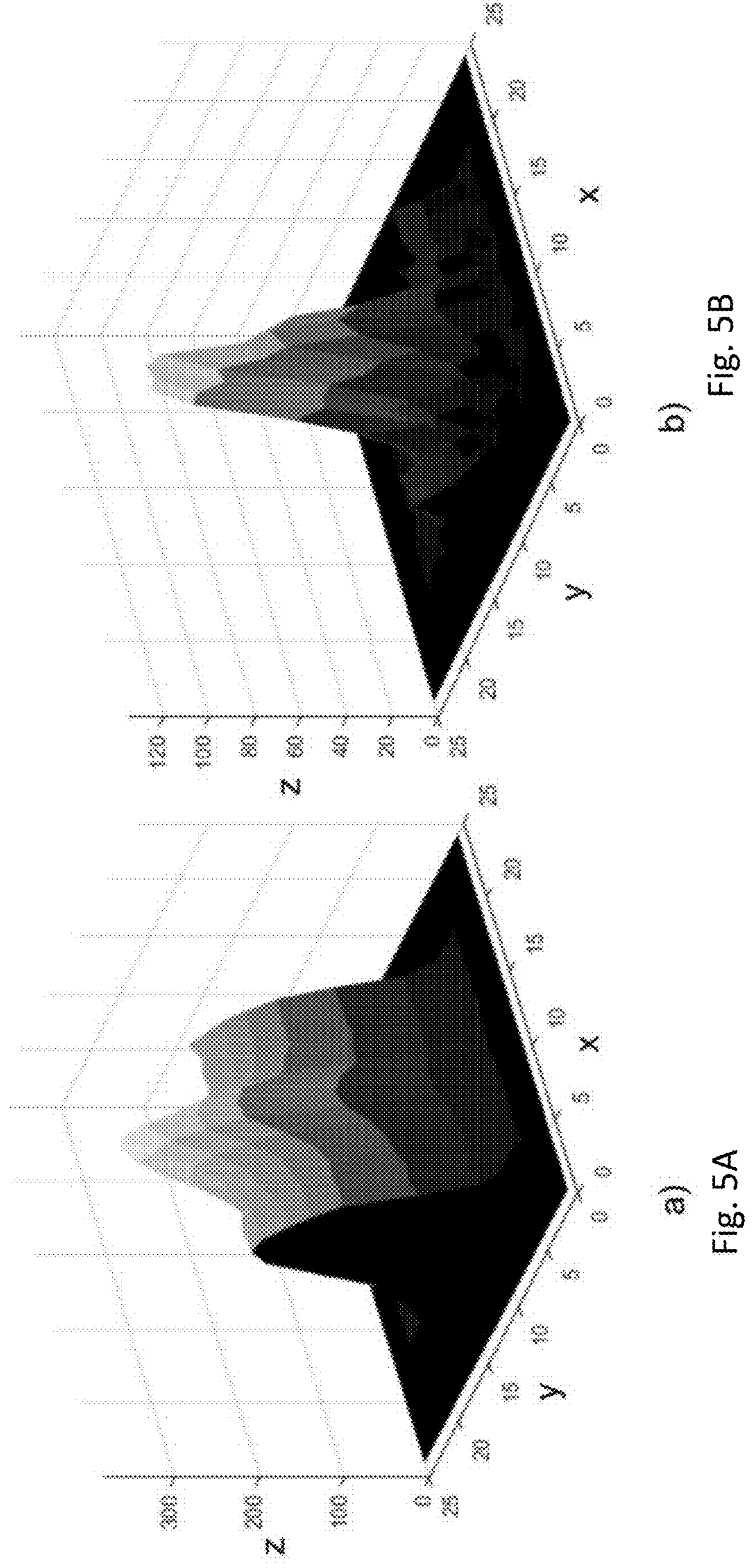
FIG. 5*a* shows a three-dimensional plot of the intensity within an example subarray of the spectrum shown in FIG. 4.
FIG. 5*b* shows the three-dimensional plot of FIG. 5*a* with a baseline removed.

4) Reference is now made to FIG. 5*a*, in which there is shown a three-dimensional plot of the intensity within an example subarray of the spectrum shown in FIG. 4. This shows a baseline level, indicated by a relative high intensity level (a "bump") along the y-dimension. In other words, considering each value on the y-axis, the minimum level is higher than zero. Removal of this baseline level is advantageous for correctly identifying the peak. Therefore, the baseline level is preferably removed by subtracting, from each pixel in the subarray either: i) the minimum intensity value across the whole subarray; or ii) the minimum intensity value across the y-value (row) of the subarray. Referring to FIG. 5*b*, there is shown the three-dimensional plot of FIG. 5*a* with a baseline removed by subtracting the minimum intensity value across the y-value (row) of the subarray. This step can be omitted in embodiments.

5) A logarithmic transform is applied to the intensities of both the reference image and the sample image. This step can also be omitted in embodiments.

Figure 6B:
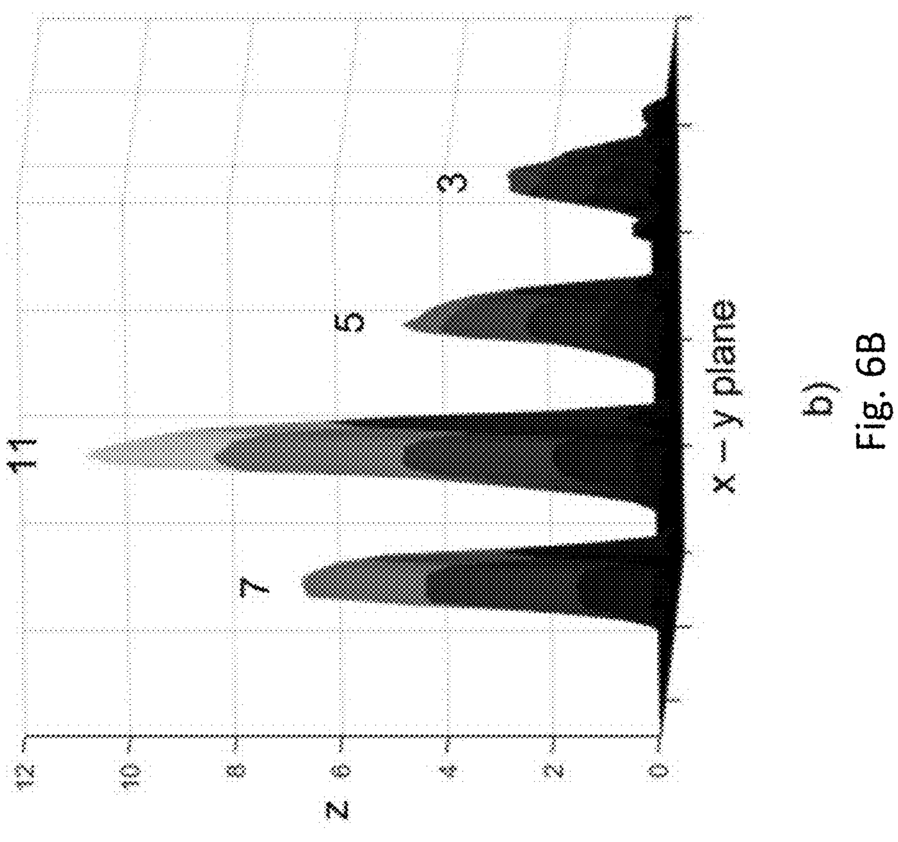
FIG. 6*b* depicts the plot of FIG. 6*a* with each intensity normalized by the associated prime number label.
Figure 6A:
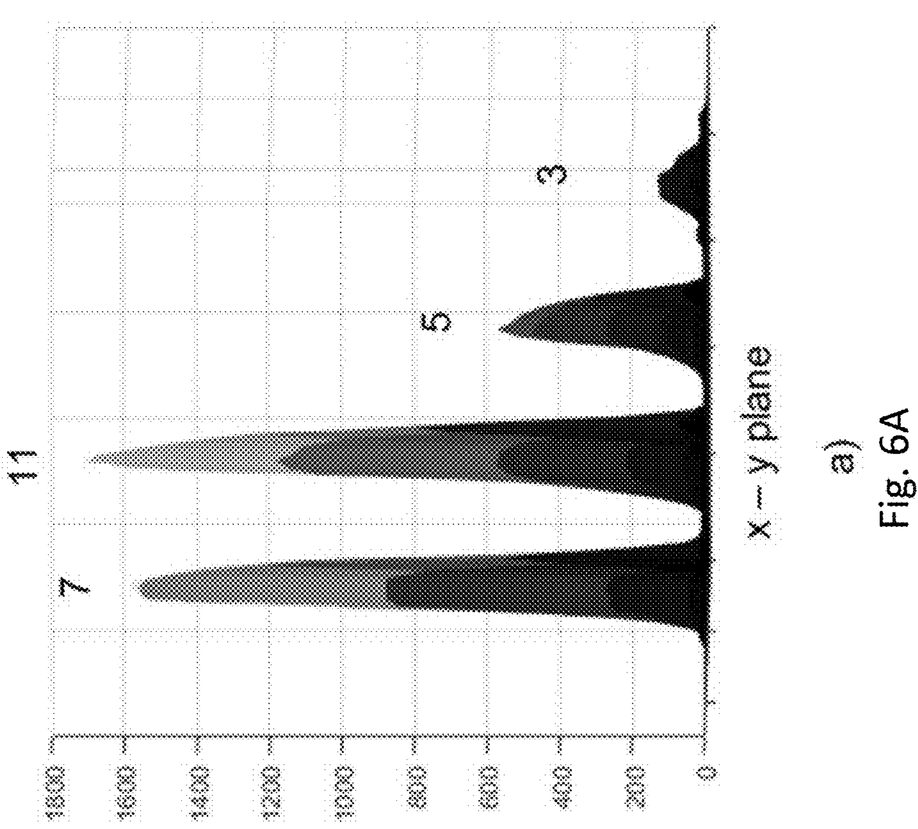
FIG. 6*a* plots the intensity of the subarrays of FIG. 4 in two dimensions with prime number labels associated with each peak.

6) Now referring to FIG. 6*a*, there is plotted the intensity of the subarrays of FIG. 4 in two dimensions with the prime number labels associated with each peak shown. The z-axis in this drawing indicates the intensity as measured. Each peak is then normalized according the respective assigned prime number label. Referring to FIG. 6*b*, there is depicted the plot of FIG. 6*a* with each intensity normalized by the associated prime number label. This is performed for both the reference image and the sample image. This normalization removes some of the peak intensity information, but retains at least that the peaks have different intensities and specifically, their intensity order. Nonetheless, by normalizing the peaks in this way, the relative weights of the peaks are regulated (for example, any peaks having a much lower intensity than other peaks will not be ignored by the algorithm).

7) A phase correlation algorithm is applied to achieve image registration between the reference image and the sample image (with unknown drift) to estimate the drift of the sample image with subpixel precision. The specific algorithm applied in this example is disclosed in Hassan Foroosh, et al., "Extension of Phase Correlation to Subpixel Registration", IEEE TRANSACTIONS ON IMAGE PROCESSING, VOL. 11, NO. 3, March 2002, page 188-199, incorporated by reference as if disclosed herein. The key elements of this algorithm are discussed below for completeness.

a. A Fourier transform is applied to both the reference and sample images ($f_0(x,y)$, $f_s(x',y')$) after pre-processing according to the above steps, to obtain frequency domain spectra ($F_0(u,v)$, $F_s(u',v')$).

b. A power spectrum is calculated:

$$H(u, v) = \frac{F_0(u, v) \cdot F_s(u', v')^*}{|F_0(u, v) \cdot F_s(u', v')^*|}.$$

c. An inverse Fourier transform is applied to the power spectrum H(u,v) to obtain a Dirac function $\delta(x'-x, y'-y)$.

d. A peak in the Dirac function is identified with a second order polynomial, which works by fitting eight pixels around the "peak" pixel (the one with maximum intensity).

e. The peak position $(x'-x, y'-y)$ is therefore obtained as the sample image drift.

Returning to the general sense discussed above, further optional and/or advantageous features may be considered. For example, the method may further comprise establishing a respective subarray around each of the plurality of identified peaks in the spectrum obtained from the sample of interest and in the spectrum obtained from the reference material. Each subarray may be based on the respective position of each identified peak in the spectrum obtained from the reference material (even the subarrays for the each identified peak in the spectrum obtained from the sample material). The comparison is beneficially based (only) on the information within the subarrays.

Optionally, the comparison uses the plurality of identified peaks with one or more of: a baseline level removed; a logarithmic transformation applied; and an intensity normalization. Advantageously, each of the identified peaks is normalized according to a number indicative of the relative maximum or magnitude of the respective peak compared with the other identified peaks in the two-dimensional optical spectrum. For example, the number may come from a set of prime numbers and in an embodiment, the numbers are selected from a contiguous range of prime numbers. In this latter case, each peak is normalized according to the number in the contiguous range of prime numbers that corresponds with the relative maximum or relative magnitude of the respective peak compared with the other identified peaks in the two-dimensional optical spectrum.

The step of determining beneficially comprises establishing the comparison using a phase correlation algorithm.

Further specific details according to a second implementation will now be discussed. Again, information relating to such a general sense of the disclosure will then be provided subsequently.

Implementation 2

The implementation will be discussed with reference to five steps, using a machine learning image registration algorithm.

1) In the reference image, four or more reference peaks are selected (as discussed below, fewer reference peaks may be used, but four are preferred). This identified rough coordinates for each of the selected reference peaks. A sample image is also obtained having the reference peaks, but shifted with respect to those in the reference by an unknown amount to be estimated.

Figure 7:
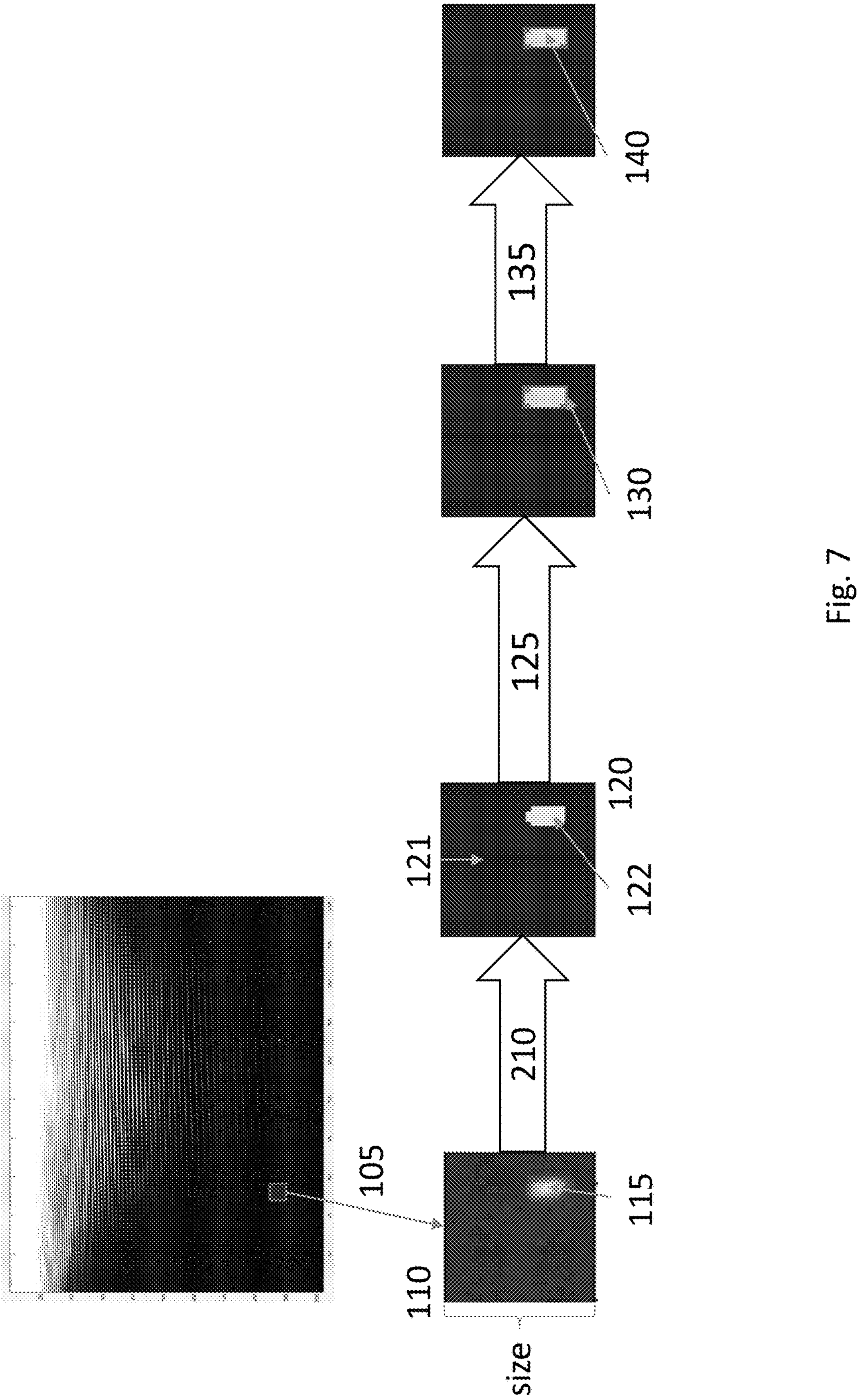
FIG. 7 shows a series of initial pre-processing steps on an example two-dimensional optical spectrum in accordance with a second implementation.

2) Pre-processing of the reference image and sample image for use in the machine learning image registration algorithm is implemented using a number of steps. There are discussed with reference to FIG. 7, in which there is shown a series of initial pre-processing steps in a schematic form and with reference to FIG. 8, in which there is shown a series of further pre-processing steps. This is based on a sample spectral image 100.

a. The rough coordinates for the selected reference peaks are used to chop 105 small image pieces from the sample image 100. If the rough coordinates for a peak 115 are $(x_n, y_n)$, then the chopped piece is determined between $$\left(x_n - \frac{\text{size}}{2}, x_n + \frac{\text{size}}{2}\right)$$

in column (x-dimension) and $$\left(y_n - \frac{\text{size}}{2}, y_n + \frac{\text{size}}{2}\right)$$

in row (y-dimension). A typical value for "size" may be 64. This results in a chopped image piece 110. This can be performed for all peaks according to image chopping step 200, shown in FIG. 8.

b. A K-means algorithm 116 with clusters=2 is used on the chopped image piece 110. The reference peak has greater intensity, so it will be extracted by a K-means algorithm. The pixel intensity of the identified peaks 122 is marked as 1 and the background pixels 121 are marked as 0, to give a peak segmentation. This is shown by segmented chopped image piece 120. Again, this is performed for all peaks according to K-means clustering step 210, also shown in FIG. 8.

c. A bounding box 130 of the peak is generated 125 from the peak segmentation.

d. The coordinates of the centre 140 of the bounding box are identified 135 as a precise position of the peak.

e. Using the identified coordinates, the sample image is then modified according to step 220 to connect the precise positions of the peaks and thereby form a polygon. The pixel values inside the polygon 230 are marked with intensity 1 and the remainder of the sample image 240 is marked with intensity 0. This operation creates a segmented image 250, with a defined (solid) polygon area that can be used for later AI training.

f. Pre-processing steps a to d are repeated for the reference spectral image.

Figure 8:
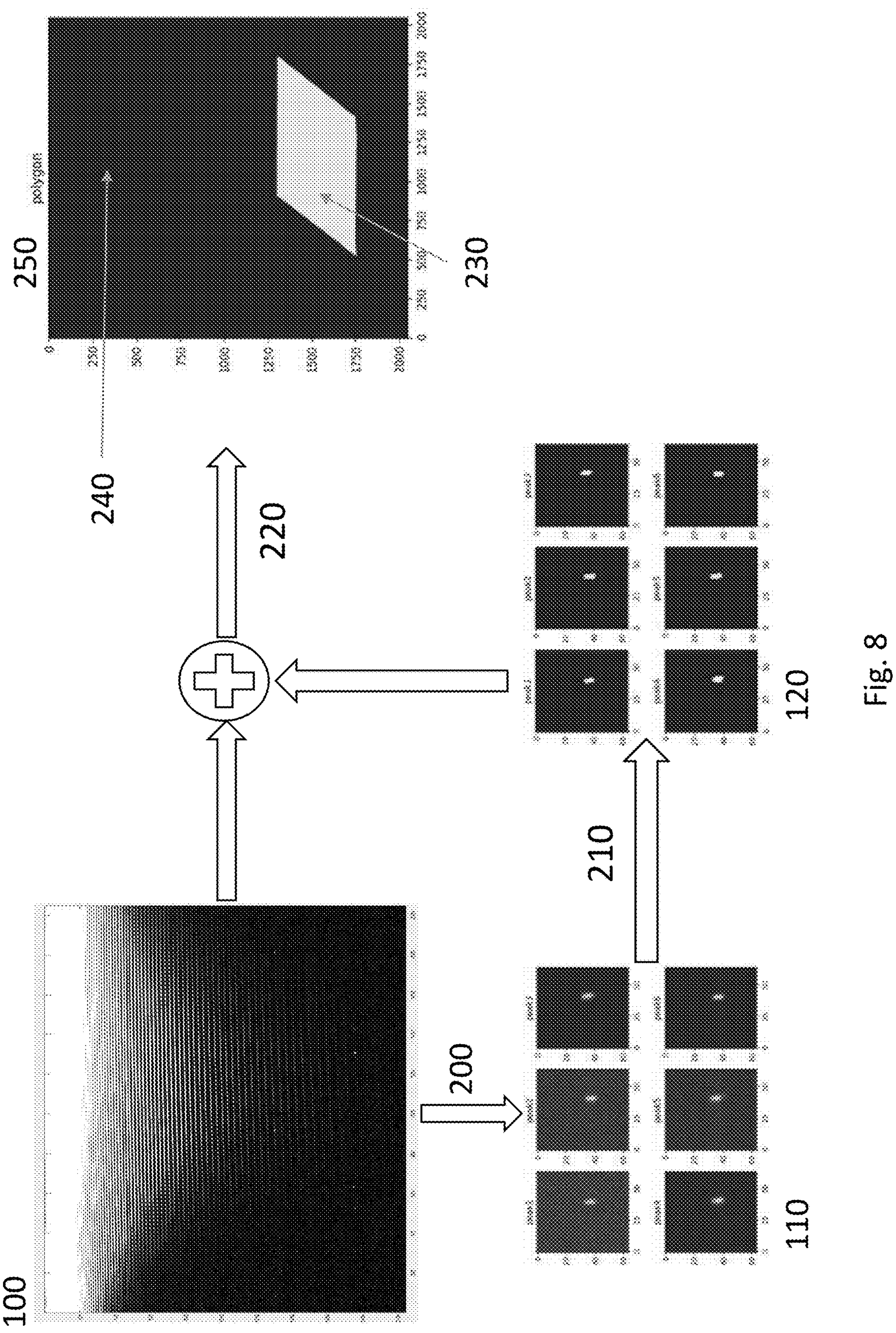
FIG. 8 shows a series of further pre-processing steps on the example two-dimensional optical spectrum.

3) Training of the machine learning image registration algorithm is initially discussed with reference to FIG. 9, in which there are illustrated additional pre-processing steps from the sample spectral image 100 and segmented image 250 shown in FIG. 8.

a. Larger pieces of the sample spectral image for each reference peak are chopped and extracted 260, using the determined precise peak positions as a centre. The chopping process is the same as discussed with reference to step 3a above, but with a larger size (for instance, size=128). This may accelerate training of the machine learning algorithm by using several (the same number as peaks) small images instead of a large 2048×2048 image. The spectral chopped pieces are normalized to provide raw image pieces 265, which are used for training (and not for finding peaks, as in step 3). Additionally, the segmented image 250 is chopped and extracted 270 for each peak with the same size and same position, to provide segmented chopped pieces 275. The chopping and extraction processes 260, 270 are performed for all peaks, resulting in a raw image piece 265 and a segmentation piece image 275 for every peak. A solid triangle shape can be seen in each chopped piece image 275. These triangles have different shapes and interior angles. They can be used as characteristic shapes for machine learning image recognition.

b. Referring next to FIG. 10, there is schematically depicted the use of an output shown in FIG. 9 in training a machine learning image registration algorithm, specifically a U-Net model (as originally described in Ronneberger, Olaf; Fischer, Philipp; Brox, Thomas (2015). "U-Net: Convolutional Networks for Biomedical Image Segmentation", Springer, Cham. This uses: a moving image (m); and fixed image (f). The U-Net model 280 is trained with moving images 281 (*m*) and fixed images 282 (*f*) based on the raw image pieces 265 for the reference spectral image and sample spectral image respectively. A spatial transform block 285 is used to identify the "Registration Field" 283 for converting the moving image to predict a "moved image" 286 corresponding with the "fixed image" 282. The "moved image" 286 is compared with the "fixed image" 282 to calculate a loss function. This segmentation piece fixed images 275 and segmentation piece moving images 276 are used for semi-supervised learning to identify the spatial transforms to arrive at a moved image segmentation 290 (acting as a mask to establish the parts for focus and thereby increase the accuracy of prediction).

The U-Net model adjust its weights to minimise the loss between "moved" and "fixed" image:

$$L_{us}(f, m, \phi) = L_{sim}(f, m^{\circ}\phi) + \lambda L_{smooth}(\phi)$$

$$L_a(f, m, s_f, s_m, \phi) = L_{us}(f, m, \phi) + \Upsilon L_{seg}(s_f, s_m{}^{\circ}(\phi))$$

where:

$L_{sim}$: penalizes differences in appearance, usually MSE 288

$L_{smooth}$: penalizes local spatial variations 287

$L_{us}$: unsupervised learning loss function $L_{seg}$: segmentation loss 289

$L_a$: semi-supervised learning loss function

Each peak is trained separately, because they may have different weights. In other words, this step is repeated for each reference peak. The U-Net model provides feature extraction and gives a "Registration Field" 283 as its output, representing the drifts in the x-dimension and the y-dimension.

Figure 9:
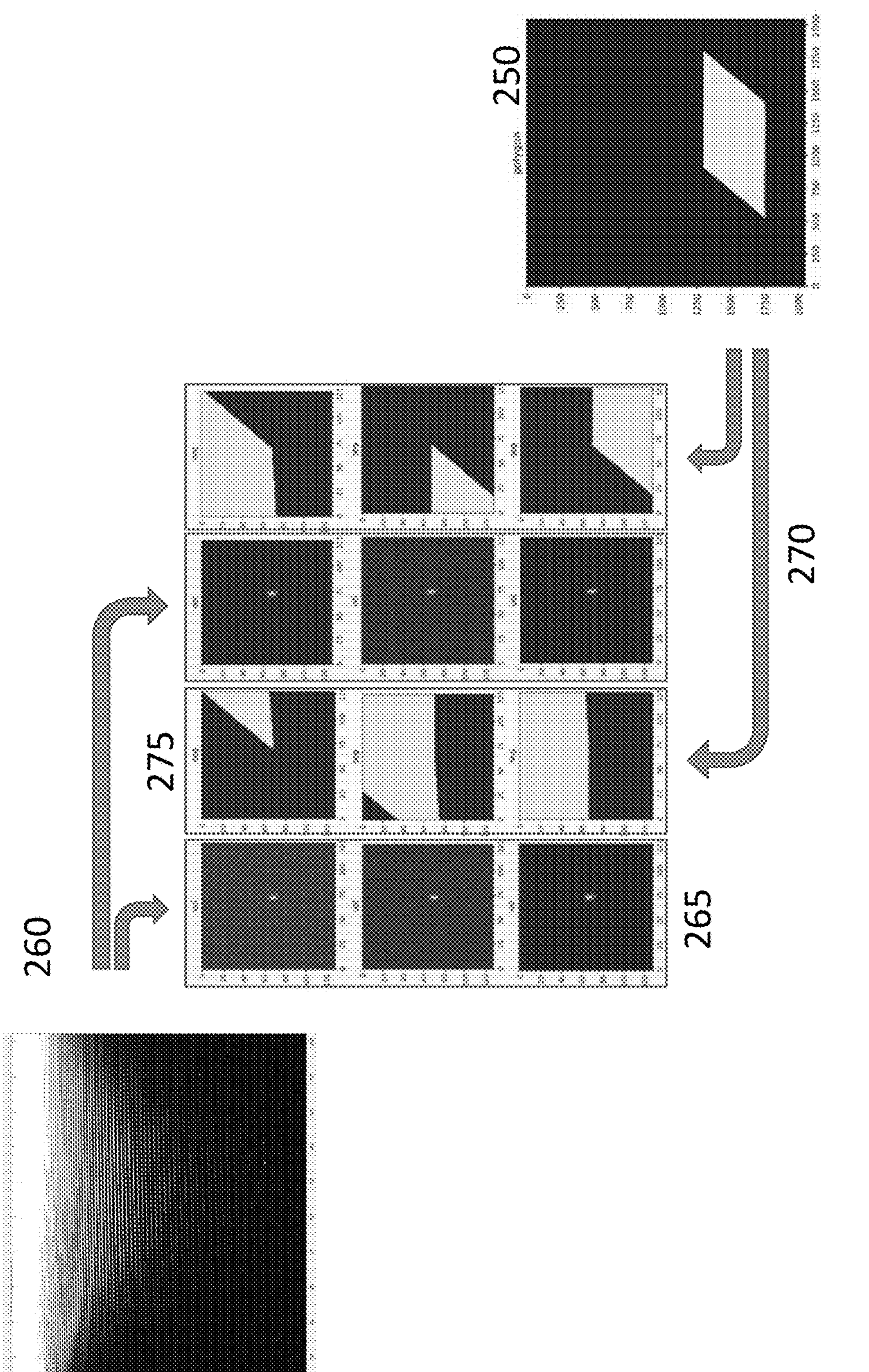
FIG. 9 illustrates additional pre-processing steps from the output shown in FIG. 8.
Figure 10:
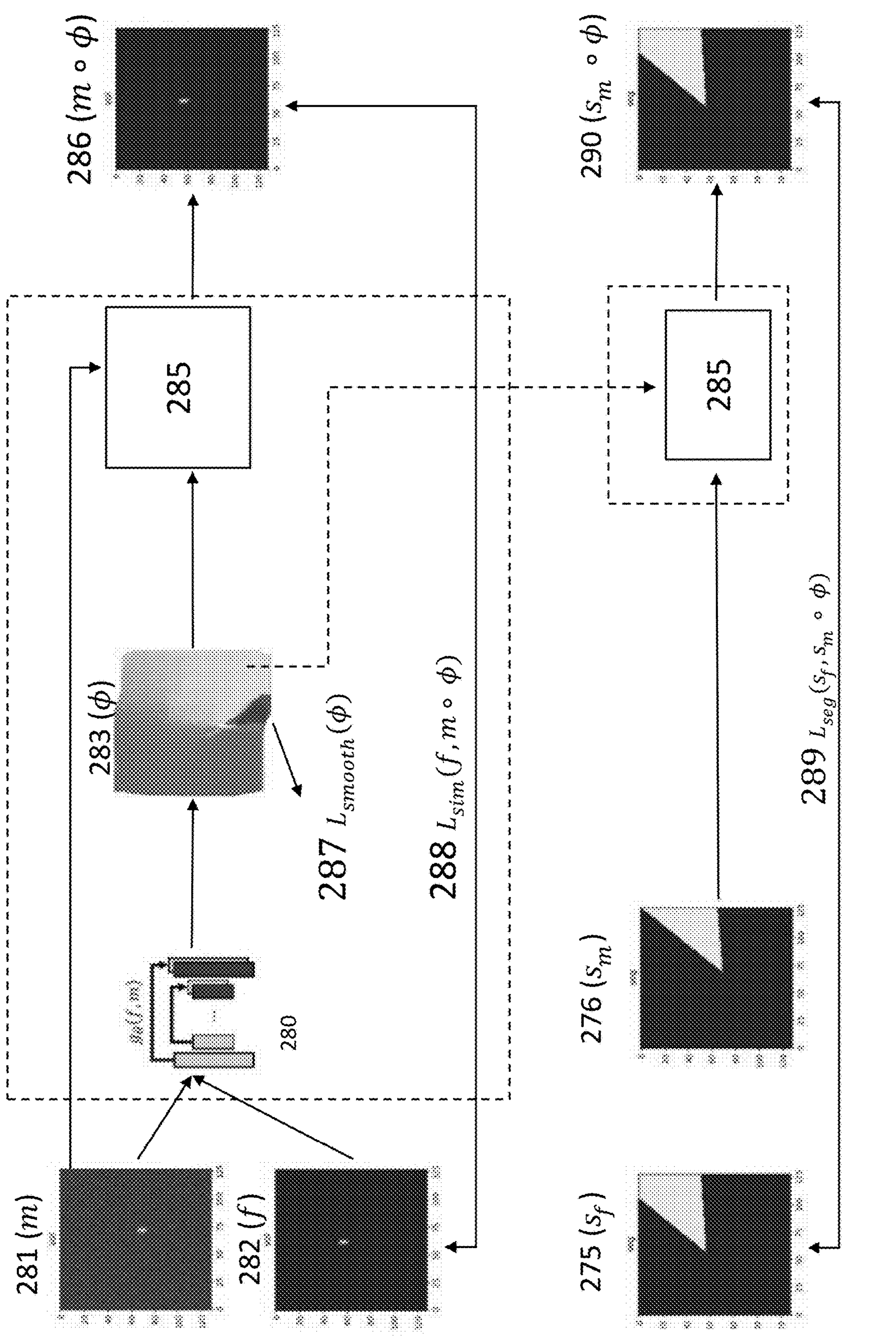
FIG. 10 schematically depicts the use of an output shown in FIG. 9 in training a machine learning image registration algorithm.
Figure 11:
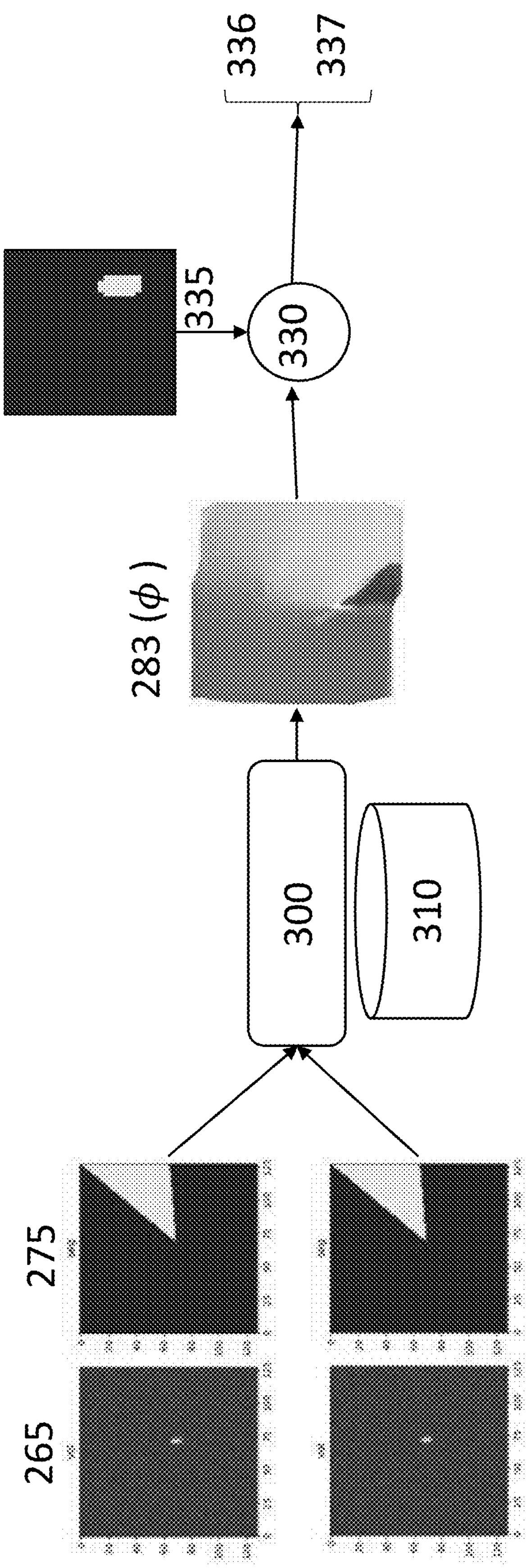
FIG. 11 schematically depicts the use of an output shown in FIG. 9 in querying the trained machine learning image registration algorithm.

4) Referring next to FIG. 11, there is schematically depicted the use of an output shown in FIG. 9 in querying the trained machine learning image registration algorithm.

a. As discussed above with reference to FIG. 9, larger pieces of the sample spectral image for each reference peak are chopped and extracted 260 using a small size and normalized to provide raw image pieces 265. Similarly, the segmented image 250 is chopped and extracted 270 for each peak with the same size and same position, to provide segmented chopped pieces 275.

b. Each raw image piece 265 and segmentation piece 275 for a peak are provided as inputs to the trained U-Net model 300. By using weights 310 (determined from the training, as discussed above), the U-Net model 300 gives a Registration Field 283 as an output. A query 330 based on the position of each peak 335 is used to determine an x-drift 336 and y-drift 337 for the peak. This results in a set of peak-specific x-drift and y-drift estimates, a x-drift and a y-drift estimate for each peak.

Figure 12:
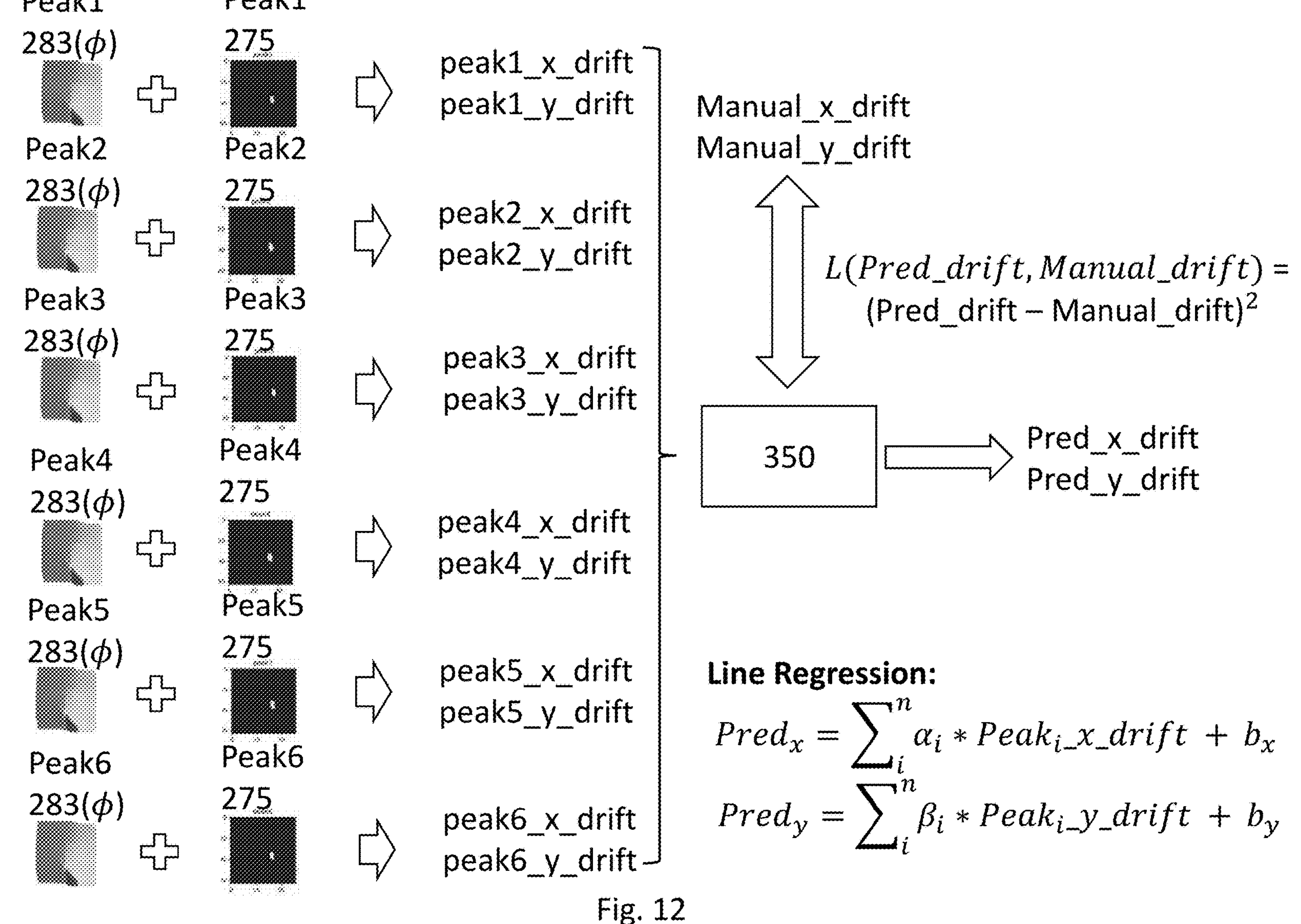
FIG. 12 schematically shows the use of query outputs from the process shown in FIG. 11 in a line regression machine learning algorithm.

5) A Line Regression algorithm can then be used to determine an overall x-drift estimate and an overall y-drift estimate. This is because the drift calculated for each of the peaks will likely be different and it is desirable for the whole image to have only one drift (dx, dy). Referring now to FIG. 12, there is schematically shown the use of query outputs from the process shown in FIG. 11 for six peaks in a line regression machine learning algorithm.

An example line regression is based on the following equations.

$$Pred_x \sum_i^n \alpha_i * \text{Peak}_i\text{\_x\_drift} + b_x$$

$$Pred_y \sum_i^n \beta_i * \text{Peak}_i\text{\_y\_drift} + b_y$$

where:

$Pred_x$: Image drift in x axis $Pred_y$: Image drift in y axis $\alpha_i$: Weight for peak i in x axis $\beta_i$: Weight for peak i in y axis $Peak_i$_x_drift: x drift of peak i from AI prediction $Peak_i$_y_drift: y drift of peak i from AI prediction $b_x$: bias for x axis $b_y$: bias for y axis The line regression algorithm is first trained using the query outputs. The pre-processing and querying in step 4) above is then performed for a given sample image. The manually identified image drift of some sample images is used as (Pred_x, Pred_y), and the machine learning predicted drift (Peak_x_drift, Peak_y_drift)_i is then used to find metrics 350, $\alpha_i$, $\beta_i$, $b_x$ and $b_y$. The weight from the line regression algorithm output is used to predict the final drift. In other words, the predicted drift from the machine learning algorithm (Peak_x_drift, Peak_y_drift)_i and constant $\alpha_i$, $\beta_i$, $b_x$ and $b_y$ are used to calculate the overall drift (Pred_x, Pred_y) of the whole image. The line regression algorithm may thereby integrate the peak-specific drift estimated from each reference peak.

Returning to the general sense of the disclosure, as considered above, further optional and/or beneficial features are considered. For example, the method may further comprise establishing a position for each of the identified peaks based on intensities of the two-dimensional optical spectrum around the respective identified peaks. For example this may be achieved by using a K-means clustering algorithm on portions of the two-dimensional optical spectrum (each portion typically comprising a single peak). The pattern may be based on the established positions for the identified peaks.

The method advantageously further comprises training a machine learning image registration algorithm, for each peak, using at least portion of the two-dimensional optical spectrum centred on each peak. Then, a peak-specific offset for each of the plurality of peaks may be determined using the trained machine learning image registration algorithm. The U-Net model may provide a suitable machine learning image registration algorithm. The machine learning image registration algorithm may be semi-supervised. For instance, a polygon formed by connecting adjacent peaks for all of the identified peaks may be defined. The machine learning image registration algorithm may be trained by using the portion of the two-dimensional optical spectrum centred on each peak (to allow semi-supervised learning), together with a corresponding portion of the defined polygon.

In embodiments, an overall peak position measurement offset can be established from the peak-specific offsets. Advantageously, a line regression machine learning algorithm may be provided with the peak-specific offsets to determine the overall peak position measurement offset. Additional details according to the general senses discussed above will be referenced further below.

Implementation 3

The implementation will be discussed with reference to four steps and uses a phase correlation image registration algorithm, in a similar way to Implementation 1.

1) Perform steps 1 and 2 of Implementation 1.

2) Pixels outside the subarrays are removed from both the reference image and the sample image to get a re-cut (smaller size) reference image and a re-cut (smaller size) sample image. This may increase the proportion of Regions Of Interest (ROI) for better accuracy of image registration. For example, assuming the original full frame image has N×N pixels, n peaks are selected as reference peaks, n subarrays are chosen with size of m×m pixels, where n×m×m<N×N, the resized image can be (n×m)×m pixels, m×(n×m) pixels, or (qn×m)×(qn×m), etc., where $\sqrt{(n)}$<qn<n, qn is a integer and qn×m<N. When the resized image has (qn×m)×(qn×m) pixels, (qn×qn−n) subframes of size m×m are filled with pixels with zero value.

3) Perform one, more than one or all of steps 4, 5 and 6 of Implementation 1. Any one or more of those steps can be omitted and these steps can be performed in a different order.

4) Apply a phase correlation algorithm to achieve image registration between the resized reference image and the resized sample image (with unknown drift) to estimate the drift of the sample image with subpixel precision (for example, as discussed in step 7 of Implementation 1).

Implementation 4

The implementation will be discussed with reference to six steps and uses a phase correlation image registration algorithm, in a similar way to Implementation 1.

1) Perform steps 1 and 2 of Implementation 1.

2) Perform one, more than one or all of steps 4, 5 and 6 of implementation 1. Any one or more of these steps can be omitted and the steps can be performed in a different order.

3) A phase correlation algorithm is applied to achieve image registration between each of the subarrays in the reference image and the corresponding subarrays in the sample image (with unknown drift), to estimate a drift of the sample image with subpixel precision (for instance, as discussed in step 7 of Implementation 1). For example, assuming the original full frame image has N×N pixels, n peaks are selected as reference peaks, n subarrays are chosen with size of m×m pixels, where n×m×m<N×N, then n values for drift will therefore be obtained.

4) The final drift of the sample image is calculated with weighted drifts as detailed in the formulae below:

$$D = \sum_{i=1}^{n} w_i \cdot D_i$$

$$w_i = C'_i / \sum_{i=1}^{n} C'_i$$

$$C'_i = \frac{\sum_{j=0}^{m}\sum_{k=0}^{m}(R_{ijk}-\overline{R}_i)\cdot(S'_{ijk}-\overline{S}'_i)}{\sqrt{\left(\sum_{j=0}^{m}\sum_{k=0}^{m}(R_{ijk}-\overline{R}_i)^2\right)\cdot\left(\sum_{j=0}^{m}\sum_{k=0}^{m}(S'_{ijk}-\overline{S}'_i)^2\right)}}$$

Where $D_i$ is the $i^{th}$ drift vector in step 3, $w_i$ is the $i^{th}$ weight of drift, $$C'_i$$

is the image correlation between the $i^{th}$ subarrays, $R_i$, in the reference image and the corresponding subarrays, $$S'_i,$$

in the sample image after drift correction with $$D_i, \overline{R}_i = \Sigma_{j=0}^{m}\Sigma_{k=0}^{m} R_{ijk}/m^2, \overline{S}'_i = \Sigma_{j=0}^{m}\Sigma_{k=0}^{m} S'_{ijk}/m^2.$$

5) Preferably, but not necessarily, in step 4, $w_i$ may be set to zero when $C_i$<$C_0$, where $C_0$ is a threshold of image correlation chosen by an operator. For example, $C_0$ can be 0.95, 0.90, 0.85, 0.80, etc.

6) Preferably, but not necessarily, a validation check is performed: if the image correlation C' between reference and sample image after drift correction is applied is no greater (or less) than it was, C, before applying the drift correction, the drift estimation is discarded (set drift vector D to zero).

$$C' = \sum_{i=1}^{n} w_i \cdot C'_i$$

$$C = \sum_{i=1}^{n} w_i \cdot C_i$$

$$C_i = \frac{\sum_{j=0}^{m}\sum_{k=0}^{m}(R_{ijk}-\overline{R}_i)\cdot(S_{ijk}-\overline{S}_i)}{\sqrt{\left(\sum_{j=0}^{m}\sum_{k=0}^{m}(R_{ijk}-\overline{R}_i)^2\right)\cdot\left(\sum_{j=0}^{m}\sum_{k=0}^{m}(S_{ijk}-\overline{S}_i)^2\right)}}$$

Where St is the $i^{th}$ subarray in the sample image before drift correction $$S_i = \Sigma_{j=0}^{m}\Sigma_{k=0}^{m} S_{ijk}/m^2.$$

Implementation 5

The implementation will be discussed with reference to five steps and uses a phase correlation image registration algorithm, in a similar way to Implementation 1.

1) Steps 1 to 7 of Implementation 1 are performed. Any one or more of steps 4, 5 and 6 of Implementation 1 can be omitted and/or those steps can be performed in a different order.

2) A validation check is performed: if the image correlation C' between reference and sample image after drift correction is no greater (or less) than it was, C, before the drift correction, the drift estimation is discarded (set drift vector D to zero).

$$C' = \frac{\sum_{j=0}^{N}\sum_{k=0}^{N}(R_{jk}-\overline{R})\cdot(S'_{jk}-\overline{S}')}{\sqrt{\left(\sum_{j=0}^{N}\sum_{k=0}^{N}(R_{jk}-\overline{R})^2\right)\cdot\left(\sum_{j=0}^{N}\sum_{k=0}^{N}(S'_{jk}-\overline{S}')^2\right)}}$$

$$C = \frac{\sum_{j=0}^{N}\sum_{k=0}^{N}(R_{jk}-\overline{R})\cdot(S_{jk}-\overline{S})}{\sqrt{\left(\sum_{j=0}^{m}\sum_{k=0}^{m}(R_{jk}-\overline{R})^2\right)\cdot\left(\sum_{j=0}^{m}\sum_{k=0}^{m}(S_{jk}-\overline{S})^2\right)}}$$

-continued $$\overline{R} = \sum_{j=0}^{N}\sum_{k=0}^{N} R_{jk}/N^2$$

$$\overline{S'} = \sum_{j=0}^{N}\sum_{k=0}^{N} S'_{jk}/N^2$$

$$\overline{S} = \sum_{j=0}^{N}\sum_{k=0}^{N} S_{jk}/N^2$$

3) If the validation check is passed (that is, the drift estimation is not discarded) in step 2, perform steps 2 to 4 of Implementation 3.

4) The same validation check as in step 2 of this Implementation is performed again.

5) If the validation check is passed (that is, the drift estimation is not discarded) in step 4, steps 2 to 6 of Implementation 4 are performed.

Referring once more to the general sense of the disclosure, as discussed above, further optional and/or advantageous features may be detailed. For example, in some embodiments, pixels outside the subarrays may be removed from both the spectrum obtained from the sample of interest and from the spectrum obtained from the reference material. Then, the comparison (of the pattern formed by peak positions of the plurality of identified peaks) is advantageously based on the spectrum obtained from the sample of interest after the removal of the pixels and the spectrum obtained from the reference material after the removal of the pixels. This may increase the proportion of ROI for better accuracy of image registration.

In some embodiments, determining the peak position measurement offset comprises determining a peak-specific offset for each of the plurality of peaks. Then, the peak position measurement offset may be calculated by taking a weighted average of the peak-specific offsets determined for the plurality of peaks. Each weight for the weighted average is beneficially determined based on a relative correlation between a portion (subarray) of the spectrum obtained from the sample of interest corresponding with the respective peak and a portion (subarray) of the spectrum obtained from the reference material corresponding with the respective peak.

The determined peak position measurement offset can optionally be validated. This can be achieved by comparing: (i) a correlation between the spectrum obtained from the sample of interest and the spectrum obtained from the reference material; and (ii) a correlation between a corrected spectrum from the sample of interest and the spectrum obtained from the reference material. Specifically, the corrected spectrum from the sample of interest may be generated by applying a correcting to the spectrum obtained from the sample of interest based on the determined peak position measurement offset.

Referring to FIG. 13, there is schematically depicted an existing system for optical spectrometry, as disclosed in GB2586046. This system can be adapted to operate in accordance with the disclosure.

The optical spectroscopy system 400 schematically illustrated is shown to comprise a light source 410, an optical arrangement 420, a detector array 430, a processor 440, a memory 445 and an input/output (I/O) unit 450. The light source 410 may be a plasma source, such as an ICP source. The optical arrangement 420 may comprise an echelle grating and a prism (and/or a further grating) to produce an echelle spectrum of the light produced by the light source 410. An image of the two-dimensional echelle spectrum is formed on the detector array 430. The detector array 430 may be a CCD (charge coupled device) array, for example. A typical detector array will have at least approximately 1024×1024 pixels (1 megapixel). A rectangular detector array may but need not be square. The detector array 430 may arranged for producing spectrum values corresponding with the detected amount of light of the echelle spectrum, and for transferring the spectrum values to the processor 440. The processor 440 may be constituted by a commercially available microprocessor. The memory 450 can be a suitable semiconductor memory and may be used to store instructions allowing the processor 440 to carry out an embodiment of a method according to the disclosure.

Although embodiments according to the disclosure have been described with reference to particular types of devices and applications (particularly ICP-OES) and the embodiments have particular advantages in such case, as discussed herein, approaches according to the disclosure may be applied to other types of device and/or application. In particular, the technique may be applied to other types of two-dimensional optical spectra. The specific structure, arrangement and operational details (for example, parameters) of the process, whilst potentially advantageous (especially in view of known configurations and capabilities), may be varied significantly to arrive at modes of operation with similar or identical performance. Certain features may be omitted or substituted, for example as indicated herein. Each feature disclosed in this specification, unless stated otherwise, may be replaced by alternative features serving the same, equivalent or similar purpose. Thus, unless stated otherwise, each feature disclosed is one example only of a generic series of equivalent or similar features.

In Implementation 1, many of pre-processing steps can be avoided and/or their order changed. For example, only the subarray processing (step 2 and step 3 in the algorithm) might be performed and steps 4 to 6 might be omitted. Any one or more of steps 4, 5 and 6 can be omitted and these steps can be performed in a different order. Also, prime number labels are used for improved processing, but the use of prime numbers is not essential. Other numerical labels can be used for Indicating relative intensity patterns.

The phase correlation algorithm, U-Net model algorithm and line regression algorithm are only examples of a wide range of algorithms that can be used according to the present disclosure. The skilled person will be aware of different image registration algorithms, whether or not using machine learning, which may be used to identify changes in the patterns of peak positions (and optionally, intensities or relative intensities). Some of these may identify peak-specific offsets that can be used to determine an overall peak position measurement offset, whilst others may be able to determine an overall peak position measurement offset directly. As discussed above, other algorithms may be used to make a drift determination on specific combinations of changes in the pattern, some of which need not use image registration, but other pattern information from the peak data.

As used herein, including in the claims, unless the context indicates otherwise, singular forms of the terms herein are to be construed as including the plural form and vice versa. For instance, unless the context indicates otherwise, a singular reference herein including in the claims, such as "a" or "an" (such as an ion multipole device) means "one or more" (for instance, one or more ion multipole device). Throughout the description and claims of this disclosure, the words "comprise", "including", "having" and "contain" and variations of the words, for example "comprising" and "comprises" or similar, mean "including but not limited to", and are not intended to (and do not) exclude other components.

The use of any and all examples, or exemplary language ("for instance", "such as", "for example" and like language) provided herein, is intended merely to better illustrate the disclosure and does not indicate a limitation on the scope of the disclosure unless otherwise claimed. No language in the specification should be construed as indicating any non-claimed element as essential to the practice of the disclosure.

Any steps described in this specification may be performed in any order or simultaneously unless stated or the context requires otherwise.

All of the aspects and/or features disclosed in this specification may be combined in any combination, except combinations where at least some of such features and/or steps are mutually exclusive. As described herein, there may be particular combinations of aspects that are of further benefit, such the combination of certain pre-processing steps with certain algorithms. In particular, the preferred features of the disclosure are applicable to all aspects of the disclosure and may be used in any combination. Likewise, features described in non-essential combinations may be used separately (not in combination).

The invention claimed is:

1. A method of determining a peak position measurement offset in a two-dimensional optical spectrum, the method comprising:

identifying a plurality of peaks that appear in both: a spectrum obtained from a reference material at known conditions; and a spectrum obtained from a sample of interest; and determining the peak position measurement offset by a comparison of a pattern formed by peak positions of the plurality of identified peaks in the spectrum obtained from the sample of interest against the spectrum obtained from the reference material, wherein the plurality of identified peaks comprises at least three peaks, and wherein positions of the plurality of identified peaks in the two-dimensional optical spectrum define vertices of an asymmetric polygon.

2. The method of claim 1, wherein the plurality of identified peaks are characteristic of a plasma chemistry of the reference material and sample materials.

3. The method of claim 1, wherein an area of the spectrum surrounded by the plurality of identified peaks is at least 10% of the two-dimensional optical spectrum.

4. The method of claim 1, wherein the pattern is formed by peak positions taking account of intensities and/or shapes of the plurality of identified peaks.

5. The method of claim 1, wherein determining the peak measurement offset comprises establishing the comparison using an image registration algorithm and/or a machine learning algorithm.

6. The method of claim 1, wherein the peak position measurement offset is determined using a peak-specific offset for each of the plurality of peaks.

7. The method of claim 1, further comprising:

establishing a respective subarray around each of the plurality of identified peaks in the spectrum obtained from the sample of interest and in the spectrum obtained from the reference material, based on a respective position of each identified peak in the spectrum obtained from the reference material, the comparison being based on information within the subarrays.

8. The method of claim 7, further comprising:

removing pixels outside the subarrays from the spectrum obtained from the sample of interest and from the spectrum obtained from the reference material, the comparison being based on the spectrum obtained from the sample of interest after removal of the pixels and the spectrum obtained from the reference material after removal of the pixels.

9. The method of claim 1, wherein the comparison uses the plurality of identified peaks with one or more of: a baseline level removed; a logarithmic transformation applied; and an intensity normalization.

10. The method of claim 1, wherein each of the identified peaks is normalized according to a number indicative of the relative maximum of the respective peak compared with the other identified peaks in the two-dimensional optical spectrum.

11. The method of claim 1, further comprising:

establishing a position for each of the identified peaks based on intensities of the two-dimensional optical spectrum around the respective identified peaks, the pattern being based on the established positions for the identified peaks.

12. The method of claim 1, wherein determining the peak position measurement offset comprises:

determining a peak-specific offset for each of the plurality of peaks; and calculating the peak position measurement offset by taking a weighted average of the peak-specific offsets determined for the plurality of peaks, each weight being determined based on a relative correlation between a portion of the spectrum obtained from the sample of interest corresponding with the respective peak and a portion of the spectrum obtained from the reference material corresponding with the respective peak.

13. The method of claim 1, further comprising:

validating the determined peak position measurement offset by comparing: (i) a correlation between the spectrum obtained from the sample of interest and the spectrum obtained from the reference material; and (ii) a correlation between a corrected spectrum from the sample of interest and the spectrum obtained from the reference material, wherein the corrected spectrum from the sample of interest is generated by applying a correcting to the spectrum obtained from the sample of interest based on the determined peak position measurement offset.

14. The method of claim 1, further comprising:

training a machine learning image registration algorithm, for each peak, using at least portion of the two-dimensional optical spectrum centered on each peak; and determining a peak-specific offset for each of the plurality of peaks using the trained machine learning image registration algorithm.

15. The method of claim 14, wherein the machine learning image registration algorithm is semi-supervised.

16. The method of claim 14, further comprising:

defining a polygon by connecting adjacent peaks for all of the identified peaks, wherein training the machine learning image registration algorithm uses the portion of the two-dimensional optical spectrum centered on each peak together with a corresponding portion of the defined polygon.

17. A computer program, comprising instructions that are configured to perform the method of claim 1 when executed by a computer.

18. A semiconductor memory, comprising instructions that are configured to perform the method of claim 1 when executed by a processor.

* * * * *